(12) United States Patent
Lee et al.

(10) Patent No.: US 11,392,282 B2
(45) Date of Patent: Jul. 19, 2022

(54) ELECTRONIC DEVICE FOR PROVIDING GRAPHICAL CONTENT AND METHOD FOR CONTROLLING SAME

(71) Applicant: Samsung Electronics Co., Ltd., Suwon-si (KR)

(72) Inventors: Woo-Yong Lee, Hwaseong-si (KR); Jun-Young Park, Suwon-si (KR); Seong-Hun Cho, Suwon-si (KR); Ki-Huk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 16/641,186

(22) PCT Filed: Aug. 21, 2018

(86) PCT No.: PCT/KR2018/009603
§ 371 (c)(1),
(2) Date: Feb. 21, 2020

(87) PCT Pub. No.: WO2019/039837
PCT Pub. Date: Feb. 28, 2019

(65) Prior Publication Data
US 2021/0089193 A1 Mar. 25, 2021

(30) Foreign Application Priority Data
Aug. 22, 2017 (KR) .................... 10-2017-0106341

(51) Int. Cl.
*G06F 3/04817* (2022.01)
*G06F 3/0482* (2013.01)
(Continued)

(52) U.S. Cl.
CPC ........ *G06F 3/04845* (2013.01); *G06F 3/0482* (2013.01); *G06F 3/04817* (2013.01); *H04L 51/04* (2013.01); *H04L 51/32* (2013.01)

(58) Field of Classification Search
CPC ............ G06F 3/04845; G06F 3/04817; G06F 3/0482; H04N 5/2621; H04N 5/272; H04M 1/72484; H04L 51/04; H04L 51/32
See application file for complete search history.

(56) References Cited

U.S. PATENT DOCUMENTS

| 9,535,571 B2 * | 1/2017 | Kim .................... G06F 3/0484 |
| 2013/0339983 A1 * | 12/2013 | Dai .......................... G06F 3/01 719/318 |

(Continued)

FOREIGN PATENT DOCUMENTS

| JP | 2005-099925 A | 4/2005 |
| JP | 2015-023553 A | 2/2015 |

(Continued)

OTHER PUBLICATIONS

ISA/KR, International Search Report and Written Opinion of the International Searching Authority, International Application No. PCT/KR2018/009603, dated Nov. 28, 2018, 12 pages.

*Primary Examiner* — Nicholas Ulrich

(57) ABSTRACT

Disclosed are an electronic device for providing graphical content and a method for controlling same. The electronic device configured to obtain graphical content from a first external device using the communication module, wherein the graphical content includes type information relating to an application which can use the graphical content; confirm at least one application corresponding to the type information from among the plurality of applications, and provide notification information relating to obtaining the graphical content through the at least one application.

12 Claims, 21 Drawing Sheets

(51) Int. Cl.
   *G06F 3/04845*   (2022.01)
   *H04L 51/52*   (2022.01)
   *H04L 51/04*   (2022.01)

(56) References Cited

U.S. PATENT DOCUMENTS

| | | | |
|---|---|---|---|
| 2015/0029550 A1 | 1/2015 | Asai | |
| 2015/0227736 A1 | 8/2015 | Guo et al. | |
| 2015/0350414 A1 | 12/2015 | Park et al. | |
| 2016/0259502 A1* | 9/2016 | Parrott | G06F 3/04817 |
| 2017/0083209 A1* | 3/2017 | Cranfill | G06F 3/04817 |
| 2019/0014240 A1 | 1/2019 | Lee et al. | |

FOREIGN PATENT DOCUMENTS

| | | |
|---|---|---|
| KR | 10-2014-0071557 A | 6/2014 |
| KR | 10-2015-0136416 A | 12/2015 |
| KR | 10-2019-0005657 A | 1/2019 |

* cited by examiner

| RecNo | package_name | tray_on_resource | type_ID |
|---|---|---|---|
| 1 | com.sec.test.stickerd | | A |

600

| RecNo | package_name | sticker_name | thumbnail_resource | thumbnail_resource_id | scene_type | sub_order |
|---|---|---|---|---|---|---|
| (null) | com.sec.test.stickerd | (null) | (null) | (null) | (null) | (null) |
| 1 | com.sec.test.stickerd | 1 | | -1 | | 1 |
| 2 | com.sec.test.stickerd | 2 | | -1 | | 2 |
| 3 | com.sec.test.stickerd | 3 | | -1 | | 3 |
| 4 | com.sec.test.stickerd | 4 | | -1 | | 4 |
| 5 | com.sec.test.stickerd | 5 | | -1 | open_mouth | 5 |
| 6 | com.sec.test.stickerd | 6 | | -1 | wink | 6 |
| 7 | com.sec.test.stickerd | 7 | | -1 | wink, sound | 7 |

| PACKAGE NAME | A | MAIN IMAGE | SUB IMAGE 1 | SUB IMAGE 2 | BACKGROUND IMAGE | DISPLAY POSITION |
|---|---|---|---|---|---|---|
| PACKAGE NAME | A | MAIN IMAGE | SUB IMAGE 1 | SUB IMAGE 2 | BACKGROUND FILTER | DISPLAY POSITION |
| PACKAGE NAME | A,C | MAIN IMAGE | SUB IMAGE 1 | SUB IMAGE 2 | BACKGROUND FILTER | DISPLAY POSITION |
| PACKAGE NAME | A,C | MAIN IMAGE | EVENT || BACKGROUND FILTER | DISPLAY POSITION |
| PACKAGE NAME | A,C | MAIN IMAGE | TEXT | SUB IMAGE 1 | SUB IMAGE 2 | DISPLAY POSITION |
| PACKAGE NAME | B | MAIN IMAGE | TEXT | SUB IMAGE 1 | SUB IMAGE 2 | DISPLAY POSITION |
| PACKAGE NAME | B | MAIN IMAGE | SUB IMAGE 1 | SUB IMAGE 2 | BACKGROUND IMAGE | DISPLAY POSITION |
| PACKAGE NAME | B | MAIN IMAGE | SUB IMAGE || BACKGROUND FILTER | DISPLAY POSITION |

FIG.6B ic content is obtained, notification information indicating that the graphical content is obtained through one or more applications that may use the graphical content, once the graphical content is obtained by the electronic device.

ELECTRONIC DEVICE FOR PROVIDING GRAPHICAL CONTENT AND METHOD FOR CONTROLLING SAME

CROSS-REFERENCE TO RELATED APPLICATIONS

This application is a National Phase Entry of PCT International Application No. PCT/KR2018/009603, which was filed on Aug. 21, 2018 and claims priority to Korean Patent Application No. 10-2017-0106341, which was filed on Aug. 22, 2017, the contents of which are incorporated herein by reference.

BACKGROUND

1. Field

The present disclosure relates to an electronic device and a control method to provide a content.

2. Description of the Related Art

With the wide spread of electronic devices such as smartphones, visual interfaces for assisting various functions/operations performed by the electronic devices have been provided variously. For example, as cameras are equipped in the electronic devices, manufacturers of the electronic devices or other application developers have provided graphical contents (e.g., character decorating emoticons, etc.) applicable to images obtained by the cameras. As the usage of social network services (SNS) rapidly increases, the graphical contents (e.g., moving emoticons) available for use in the SNSs have been provided by the manufacturers of the electronic devices or the interface developers.

The graphical contents provided by the manufacturers of the electronic devices or other application developers are provided to users in various visual forms such as static emoticons, dynamic emoticons, stickers, or stamps.

SUMMARY

In a conventional electronic device that provides the graphical content, the graphical content may not be provided in other applications than any one application (e.g., a camera application) that may use the graphical content. Thus, the user of the electronic device, even when obtaining (e.g., buying in an on-line application market (e.g., Samsung Apps™)) the graphical content the user desires to use, may not be provided with a function/operation of using (in other words, sharing) the graphical content in various applications.

Moreover, in the conventional electronic device providing the graphical content, when the user of the electronic device obtains the graphical content, for example, by buying the graphical content in the on-line application market, the user may not be provided with a function/operation of outputting (in other words, providing) notification information indicating that a new graphical content is obtained (in other words, installed) to the user through any one application that may use the graphical content, or the other applications.

According to various embodiments of the present disclosure, there is provided an electronic device to use graphical content obtained by the electronic device in various applications.

According to various embodiments of the present disclosure, there is also provided an electronic device to provide notification information indicating that the graphical content is obtained through one or more applications that may use the graphical content, once the graphical content is obtained by the electronic device.

According to various embodiments of the present disclosure, there is provided a computer-readable recording medium having recorded thereon at least one operation to use the graphical content obtained by the electronic device in various applications.

According to various embodiments of the present disclosure, there is also provided a computer-readable recording medium having recorded thereon at least one operation to provide notification information indicating that the graphical content is obtained through one or more applications that may use the graphical content, once the graphical content is obtained by the electronic device.

According to various embodiments of the present disclosure, there is provided an operation method of an electronic device to use graphical content obtained by the electronic device in various applications.

According to various embodiments of the present disclosure, there is also provided an operation method of an electronic device to provide notification information indicating that the graphical content is obtained through one or more applications that may use the graphical content, once the graphical content is obtained by the electronic device.

According to various embodiments of the present disclosure, an electronic device includes a communication module, a memory storing a plurality of applications, a display, and a processor, in which the processor is configured to obtain graphical content from an external device by using the communication module, the graphical content including type information related to an application that may use the graphical content, to identify one or more applications corresponding to the type information among the plurality of applications, and to provide notification information related to the obtaining of the graphical content through the one or more applications.

According to various embodiments of the present disclosure, a computer-readable recording medium has stored therein instructions configured to perform at least one operation by a processor, in which the at least one operation includes obtaining graphical content from an external device by using a communication module, the graphical content including type information corresponding to an application that may use the graphical content, identifying one or more applications corresponding to the type information among a plurality of applications, and providing notification information related to the obtaining of the graphical content through the one or more applications.

According to various embodiments of the present disclosure, an operation method of an electronic device includes obtaining graphical content from an external device by using a communication module, the graphical content including type information corresponding to an application that may use the graphical content, identifying one or more applications corresponding to the type information among a plurality of applications, and providing notification information related to the obtaining of the graphical content through the one or more applications.

According to various embodiments of the present disclosure, the graphical content obtained by the electronic device is provided to be used in various applications, thus improving user convenience in using the electronic device.

According to various embodiments of the present disclosure, once the graphical content is obtained by the electronic device, notification information indicating that the graphical content is obtained through one or more applications that may use the graphical content is provided, thereby enhancing user convenience in using the electronic device.

Effects according to various embodiments disclosed in the present disclosure are not limited to the described effects, and it would be obvious to those of ordinary skill in the art that various effects are included in the present disclosure.

BRIEF DESCRIPTION OF THE DRAWINGS

FIGS. 6A and 6B are views for describing a function/operation of storing graphical content based on type information, according to various embodiments.

DETAILED DESCRIPTION

Figure 1:
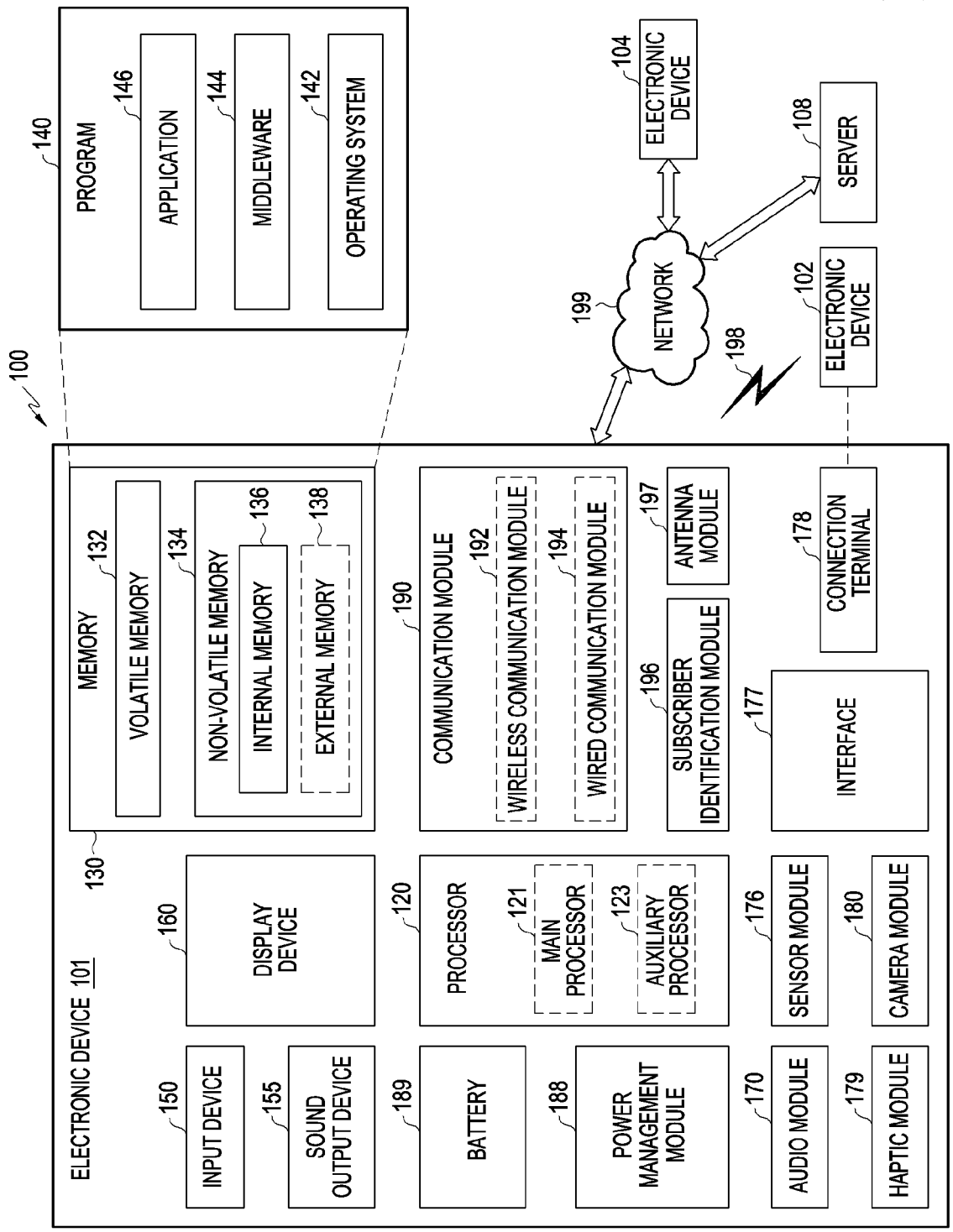
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiment, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor (AP)) and an auxiliary processor 123 that is operable independently from the main processor 121. In addition to, or instead of, the main processor 121, the auxiliary processor 123 may include an auxiliary processor 123 (e.g., a graphics processing unit (GPU), an image signal processor, a sensor hub processor, or a communication processor) that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display 160 may include a touch circuitry or a pressure sensor capable of measuring the strength of a pressure with respect to a touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a GNSS communication module) or a wired communication module 194 (e.g., an LAN communication module or a power-line communication module), and may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., an LAN or wide area network (WAN)). The above-enumerated types of communication modules 190 may be implemented in a single chip, where at least some of the modules are integrated, or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, some or all of operations performed by the electronic device 101 may be performed in another electronic device or a plurality of other electronic devices. According to an embodiment, when the electronic device 101 has to perform a function or a service automatically or at a request, the electronic device 101 may request an external electronic device to perform at least some functions associated with the function or the service, instead of or in addition to executing the function or the service. The external electronic device having received the request may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
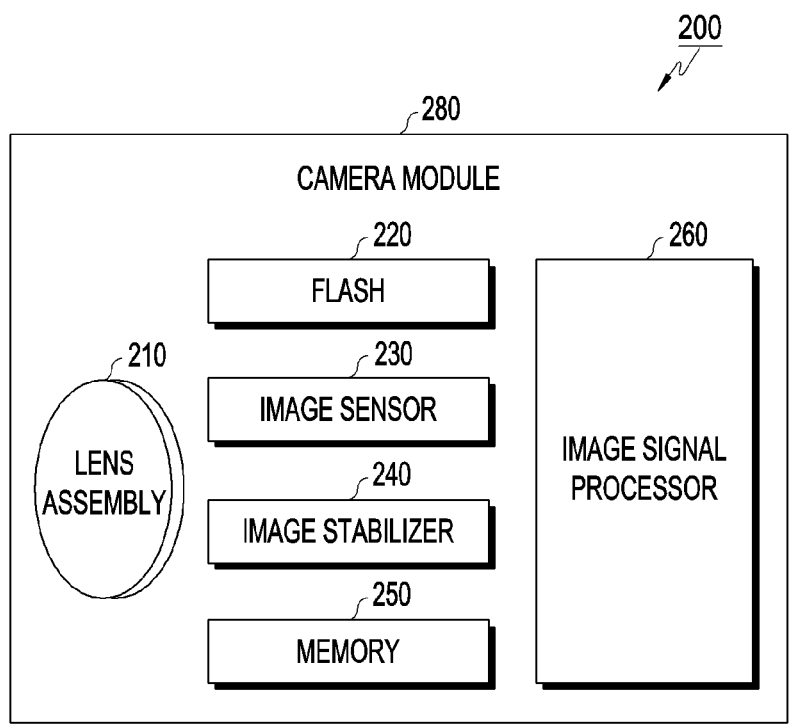
FIG. 2 is a block diagram of a camera module according to various embodiments.

FIG. 2 is a block diagram 200 of the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. The plurality of lens assemblies 210 may have the same lens attribute (e.g., view angle, focal length, auto-focusing, f number, or optical zoom), or at least one lens assembly may have at least one other lens attribute different from those of another lens assembly. The lens assembly 210 may include, for example, a wide-angle lens or a telephoto lens. The flash 220 may emit a light source that is used to reinforce light emitted from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light transmitted from the object via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented with, for example, a charged coupled device (CCD) sensor or a complementary metal oxide semiconductor (CMOS) sensor.

The image stabilizer 240 may move or control (e.g., adjust read-out timing) at least one lens included in the lens assembly 210 or the image sensor 230 to at least partially compensate for a negative influence (e.g., image blurring) of movement of the camera module 180 or the electronic device 101 including the same upon a captured image in response to the movement. According to an embodiment, the image stabilizer 240 may be implemented with, for example, an optical image stabilizer, and may sense such a movement using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 160. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image synthesizing, or image compensation (e.g., noise reduction, resolution adjustment, brightness adjustment, blurring, sharpening, or softening) on an image obtained by the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed, by the processor 120, via the display device 160 as it is or after being further processed.

According to an embodiment, the electronic device 101 may include two or more camera modules 180 having different attributes or functions. In this case, for example, at least one camera module 180 may be a wide-angle camera or a front camera, and at least one another camera module may be a telescopic camera or a rear camera.

Figure 3:
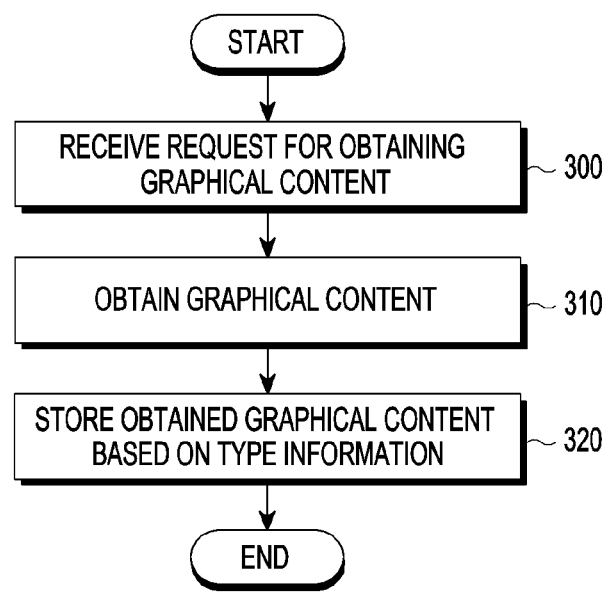
FIG. 3 is a view for describing an operation method of an electronic device, according to various embodiments.

FIG. 3 is a view for describing an operation method of an electronic device, according to various embodiments.

Referring to FIG. 3, according to various embodiments of the present disclosure, in operation 300, the electronic device 101 (e.g., the processor 120) may receive a request for obtaining the graphical content by using an input device (e.g., the display device 160).

According to various embodiments of the present disclosure, in operation 310, the electronic device 101 (e.g., the processor 120) may obtain the graphical content from an external electronic device (e.g., the server 108) by using a communication device (e.g., the communication module 190) at the request for obtaining the graphical content.

According to various embodiments of the present disclosure, in operation 320, the electronic device 101 (e.g., the processor 120) may store the obtained graphical content in the electronic device 101 based on type information of the graphical content, by using a storage device (e.g., the memory 130).

Herein, the expression "obtaining data (or information) about graphical content package" or "obtaining data (or information) about the graphical content" may be briefly mentioned as "obtaining the graphical content package" or "obtaining the graphical content" in at least some embodiments.

FIGS. 4A through 4D are views for describing a function/operation of obtaining graphical content at the request for obtaining the graphical content, according to various embodiments.

Figure 4A:
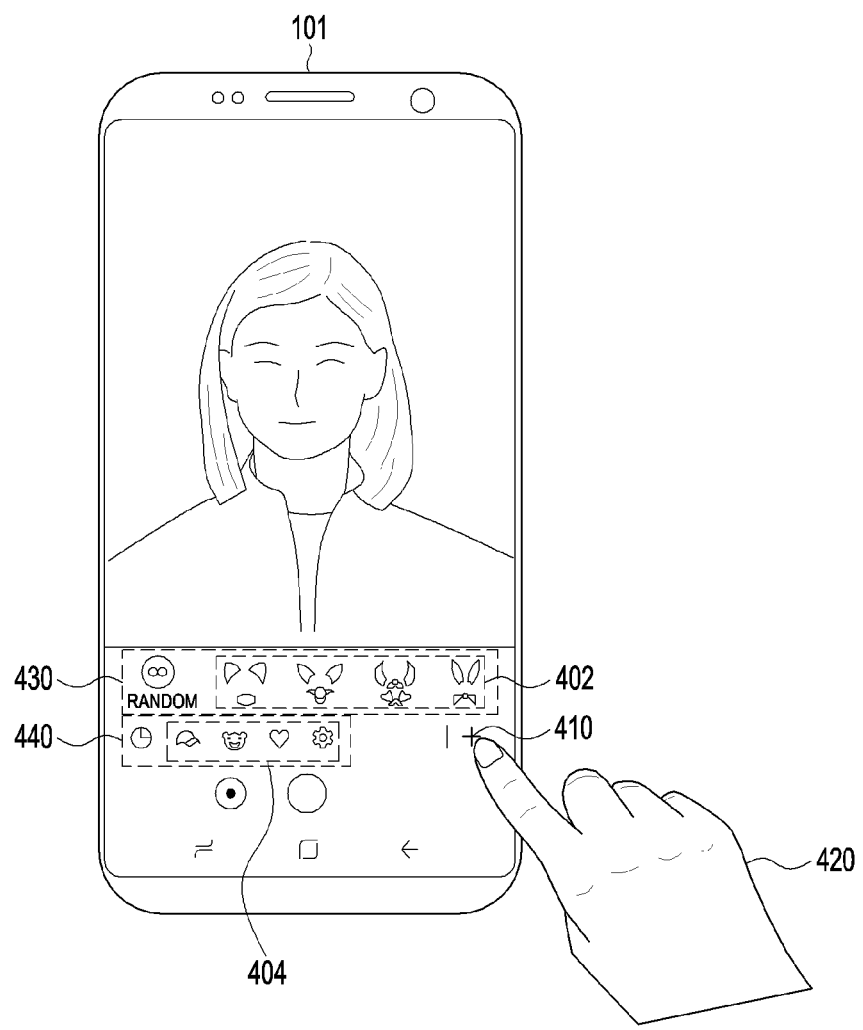
FIGS. 4A through 4E are views for describing a function/operation of obtaining graphical content at the request for obtaining the graphical content, according to various embodiments.

FIG. 4A illustrates a case where a camera application is being executed. On an execution screen of the camera application may be displayed an image obtained by a camera module (e.g., the camera module 180) of the electronic device 101. On the execution screen of the camera application may be displayed at least one first image 402 indicating at least one graphical content available through the camera application. According to various embodiments of the present disclosure, the graphical content may include various visual interfaces such as emoticons, stickers, stamps, etc. According to various embodiments of the present disclosure, upon receiving a selection input with respect to the first image 402, the electronic device 101 may display graphical content (e.g., a sticker for providing various visual effects to a portrait) corresponding to the first image 402 on the execution screen of an application (e.g., the camera application).

According to various embodiments of the present disclosure, the graphical content may be obtained as a graphical content package (e.g., an Android® application package (APK)). When the graphical content is obtained as the graphical content package, the first image 402 and a second image 404 indicating the graphical content package may be displayed on the execution screen of the camera application. In other words, the second image 404 may be a representative image representing the graphical content package. According to various embodiments of the present disclosure, the first image 402 may be displayed on a first region 430 of, for example, the execution screen of the camera application. According to various embodiments of the present disclosure, the second image 404 may be displayed on a second region 440 of, for example, the execution screen of the camera application. On the second region 440 of the camera application may be displayed an interface 410 for receiving a request for obtaining the graphical content and/or the graphical content package. The request for obtaining the graphical content and/or the graphical content package may include, for example, a touch input with respect to the interface 410. In at least some embodiments, the term "second region 440" may be referred to as a "tray". In addition, in at least some embodiments, the terms "first image 402" and "second image 404" may be referred to as a "first thumbnail image" and a "second thumbnail image", respectively.

In FIG. 4A, an embodiment is illustrated in which as an example of the request for obtaining the graphical content, the request for obtaining the graphical content and/or the graphical content package is received in response to a touch input made by a user 420.

Figure 4B:
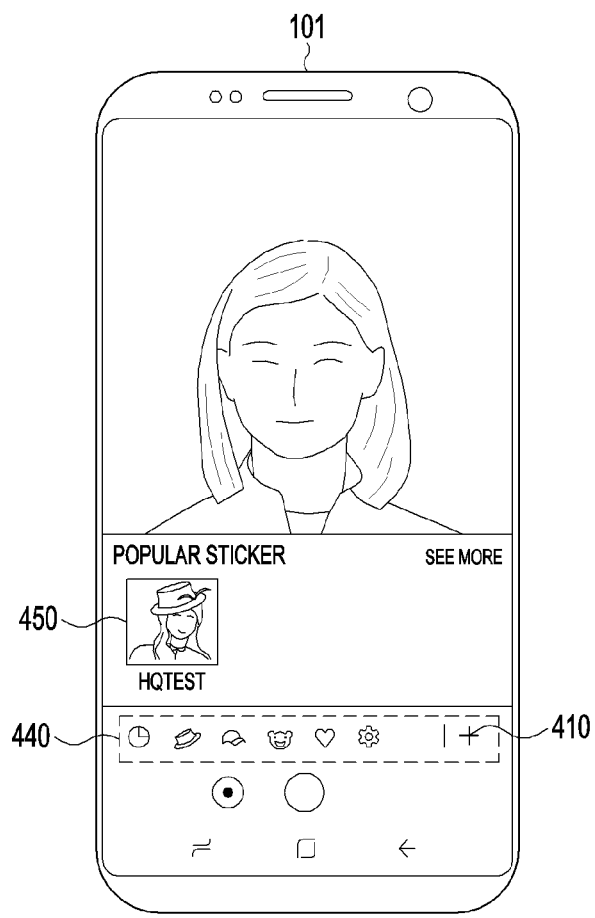

Referring to FIG. 4B, the electronic device 101 may display an interface 450 for connecting to a server (e.g., the server 108) on the execution screen of the camera application to obtain the graphical content package in response to the request for obtaining the graphical content package. According to various embodiments of the disclosure, a request for connecting to the server 108 may include a touch input with respect to the interface 450. According to various embodiments of the disclosure, the electronic device 101 may directly switch to a screen for obtaining the graphical content package from the execution screen of the camera application, without executing a separate application (e.g., a Samsung Apps' application), when the electronic device 101 transmits the request for connecting to the server 108.

Figure 4C:
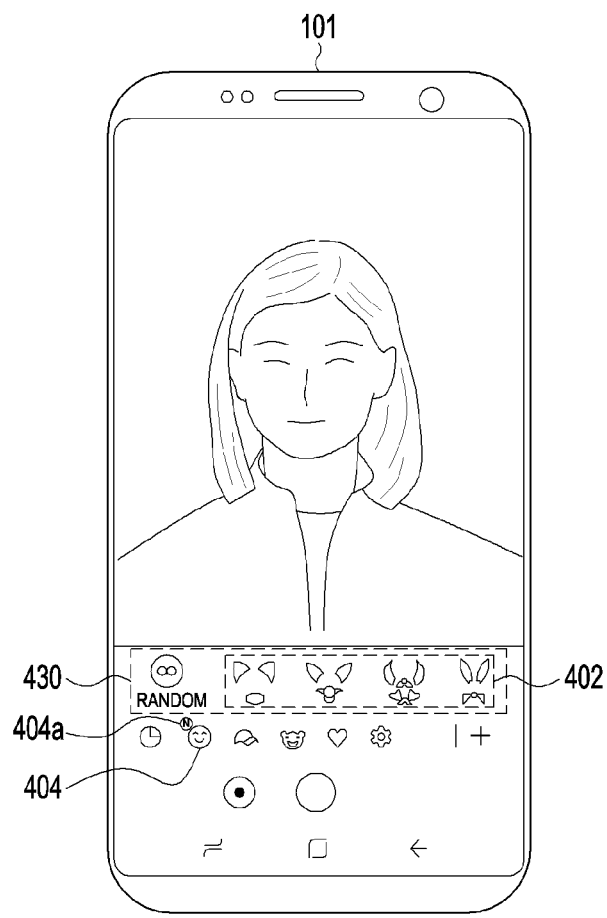

Referring to FIG. 4C, the electronic device 101 may obtain the graphical content package from the server 108. Once obtaining the graphical content package from the server 108, the electronic device 101 may parse the obtained graphical content package. The electronic device 101 may display the second image 404 included in the graphical content package on the second region 440. As the electronic device 101 obtains the graphical content package, the electronic device 101 may display notification information on the electronic device 101 to notify to the user 420 that the obtained graphical content package is newly obtained (in other words, installed) graphical content and/or a graphical content package. In FIG. 4C is illustrated an embodiment in which as an example of the notification information, an interface 404a of a badge type is displayed around the second image 404. According to various embodiments, the notification information may include audible information like an output of a notification sound as well as visual information that displays the interface 404a.

According to various embodiments of the present disclosure, the electronic device 101 may obtain all graphical contents included in the graphical content package from the server 108 in response to the request for obtaining the graphical content package. The electronic device 101 may display the first image 402 corresponding to all of the graphical contents by parsing the graphical content package obtained from the server 108. According to various embodiments of the present disclosure, the electronic device 101 may obtain some of the graphical contents included in the graphical content package from the server 108 in response to the request for obtaining the graphical content package, and provide the graphical contents to the user 420. According to various embodiments of the present disclosure, the electronic device 101 may obtain all of the graphical contents included in the graphical content package from the server 108, then activate the first image 402 corresponding to some graphical contents therein to display the first image 402 on the first region 430, and deactivate the other some graphical contents to display the other graphical contents on the first region 430. According to various embodiments of the present disclosure, the activated first image 402 may be displayed as a color image, and the deactivated first image 402 may be displayed as a gray image. According to various embodiments of the present disclosure, the electronic device 101 may display thereon a notification message for notifying to the user 420 that graphical content corresponding to the deactivated first image 402 is a pay content, to activate the deactivated first image 402. Once payment information regarding the graphical content corresponding to the deactivated first image 402 is identified, the electronic device 101 may change the deactivated first image 402 into an active state and display the first image 402. Thus, the user 420 may use all of the graphical contents included in the graphical content package. According to various embodiments of the present disclosure, the electronic device 101 may obtain from the server 108, a bitmap image for the first image 402 corresponding to the graphical content included in the graphical content package, in response to the request for obtaining the graphical content package. The electronic device 101 may display the obtained bitmap image on the first region 430. Upon receiving a selection input (e.g., a touch input with respect to the displayed bitmap image) for using the displayed bitmap image (in other words, the first image 402) from the user 420, the electronic device 101 may display thereon a notification message for notifying to the user 420 that graphical content corresponding to the bitmap image is a pay content. Upon identifying payment information regarding a graphical content package including the graphical content, the electronic device 101 may transmit the request for obtaining the graphical content package to the server 108 and obtain the graphical content package from the server 108. According to various embodiments of the present disclosure, the electronic device 101 may obtain from the server 108, data for the second image 440 from the server 108 in response to the request for obtaining the graphical content package and display the obtained data on the second region 440. Upon receiving a selection input with respect to the displayed second image 404 from the user 420, the electronic device 101 may display thereon a notification message for notifying to the user 420 that the graphical content package corresponding to the second image 404 is a pay content. Upon identifying payment information regarding the graphical content package, the electronic device 101 may transmit the request for obtaining the graphical content package to the server 108 and obtain the graphical content package from the server 108. Thus, the user 420 may use the graphical content included in the graphical content package.

Figure 4D:
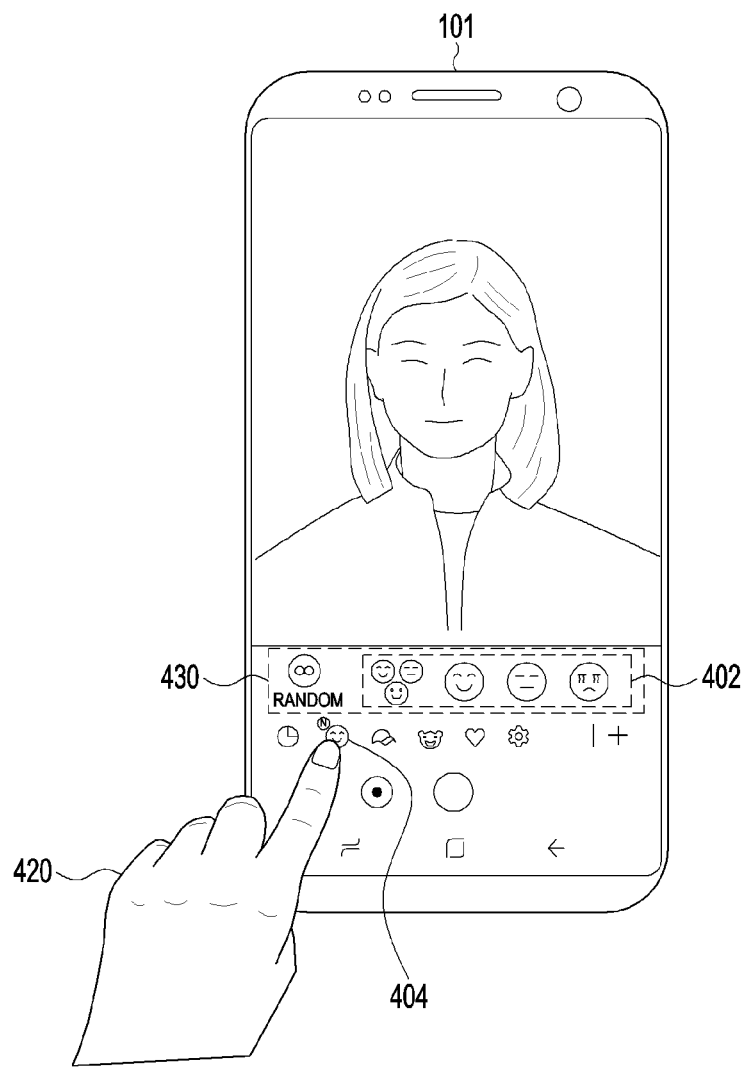

Referring to FIG. 4D, the electronic device 101 may receive a selection input with respect to the second image 404 from the user 420. Upon receiving the selection input with respect to the second image 404, the electronic device 101 may display the first image 402 corresponding to each graphical content included in the obtained graphical content package on the first region 430.

The graphical content package and/or the graphical content illustrated in FIGS. 4C and 4D may be graphical content and/or a graphical content package selected by the user 420 from a list of obtainable graphical content packages displayed on the electronic device 101.

Figure 4E:
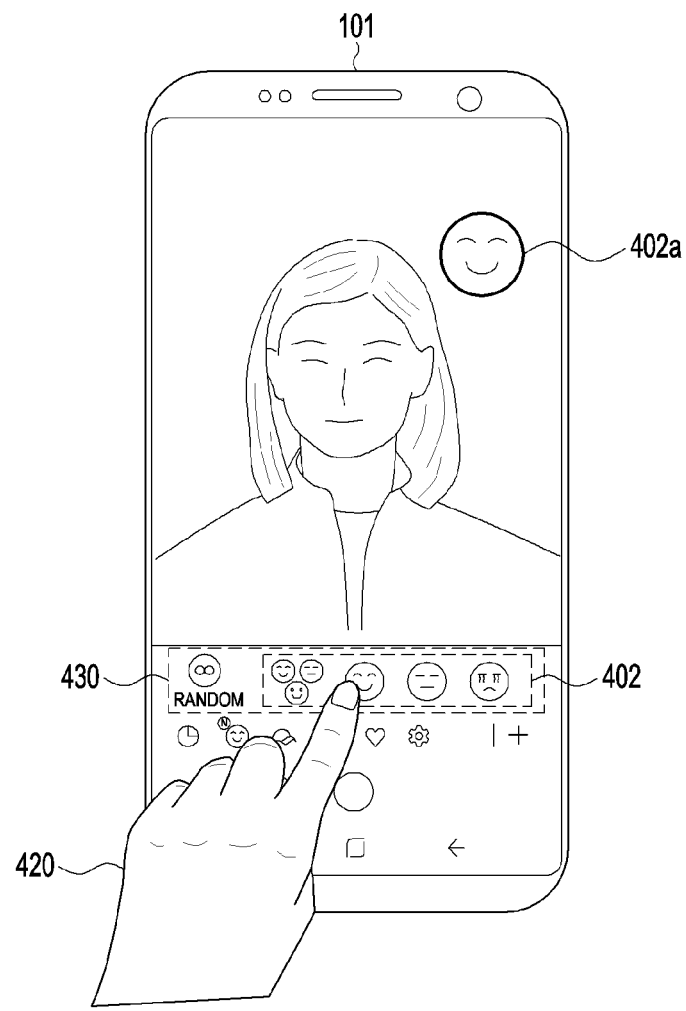

Referring to FIG. 4E, upon receiving a selection input with respect to the first image 402 from the user 420, the electronic device 101 may display graphical content 402a corresponding to the selected first image 402 in a designated position of the execution screen of the application.

FIGS. 5A through 5D are views for describing a data field 500 of graphical content, according to various embodiments.

Figure 5A:
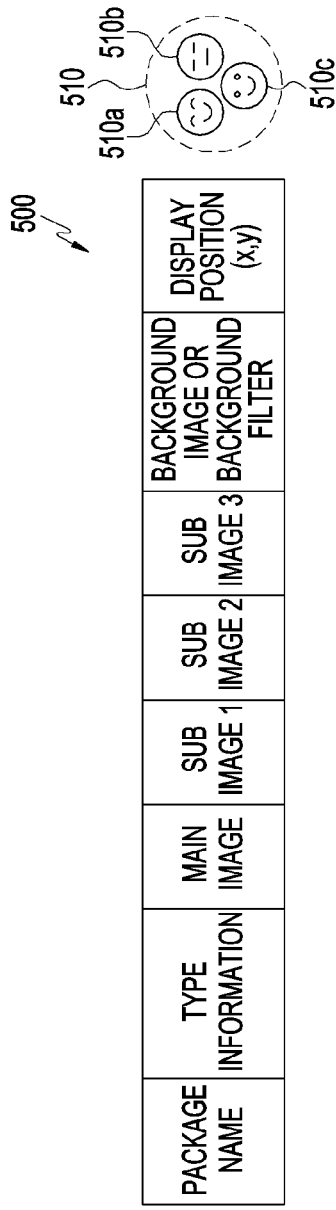
FIGS. 5A through 5D are views for describing a data field of graphical content, according to various embodiments.

According to various embodiments of the present disclosure, the graphical content may include various forms. In FIG. 5A is illustrated an embodiment in which graphical content 510 includes three sub-images 510a, 510b, and 510c constituting the graphical content 510. In case of the graphical content 510 as shown in FIG. 5A, items of a data field 500 for the graphical content 510 may include, for example, a field for a package name, a field for type information of the graphical content 510, a field for a main image (e.g., the first image 402), a field for a sub-image 1 (e.g., the sub image 510a), a field for a sub-image 2 (e.g., the sub-image 510b), a field for a sub-image 3 (e.g., the sub-image 510c), a field for a background image displayed together with the graphical content 510 or for a background filter applied together depending on the graphical content 510 on an execution screen of an application, and a field for a display position in which the graphical content 510 is displayed on the execution screen of the application.

According to various embodiments of the present disclosure, the package name may mean a name of graphical content package including the graphical content 510. For example, the name of the graphical content package may be set to "com.sec.test.stickerd" as illustrated in FIG. 6A. The type information may mean information about an application/applications executable by the graphical content 510. For example, when "A (e.g., an "A type" is designated to indicate the camera application)" is stored (in other words, recorded) in the field for the type information, the graphical content 510 may be executed in the camera application.

According to various embodiments of the present disclosure, a plurality of pieces of type information may be stored in the field for the type information. For example, when "A, C (e.g., a "C type" is designated to indicate a chat application)" is stored in the field for the type information, the graphical content 510 may be executed in the camera application and the chat application.

According to various embodiments of the present disclosure, information (e.g., the first image 402) indicating the graphical content 510 may be stored in the field for the main image. According to various embodiments of the present disclosure, upon receiving a selection input with respect to the first image 402, the electronic device 101 may display the graphical content 510 on the execution screen of the application based on information stored in an information field stored in the main image. The main image may be the same as or different from the graphical content 510. For example, when graphical content (e.g., graphical content 530) is expressed as a dynamic image, the main image may be stored as a static image of the graphical content 530 at a particular point in time. According to various embodiments of the present disclosure, information about all images of the graphical content 510 including the three sub-images 510a, 510b, and 510c may be stored in the information field for the main image. Thus, for example, the main image may be displayed on the first region 430, as illustrated in FIG. 4D.

According to various embodiments of the present disclosure, when the graphical content 510 includes at least one sub-image (e.g., the sub-image 1 510a, the sub-image 2 510b, and the sub-image 3 510c), an information field for the graphical content 510 may include a field in which information about the at least one sub-image is stored. In FIG. 5A is illustrated an embodiment in which the graphical content 510 includes the three sub-images 510a, 510b, and 510c.

According to various embodiments of the present disclosure, in a field for the background image displayed together with the graphical content 510 or a field for a background filter applied together depending on the graphical content 510 on an execution screen of an application, information about various visual effects applied together with the graphical content 510 may be stored. According to various embodiments of the present disclosure, the background image may include a preset image or an image set by the user 420. According to various embodiments of the present disclosure, the background filter may include a visual effect that brightens the entire screen on which the graphical content 510 is displayed at a preset rate when the graphical content 510 is displayed. According to various embodiments of the present disclosure, the background filter may include a preset filter or a filter set by the user 420.

According to various embodiments of the present disclosure, in an information field for the display position, information about the position where the graphical content 510 is displayed on the execution screen of the application may be stored. For example, in the information field for the display position may be stored information about fixed coordinates of a position to display the graphical content 510 regardless of a position of an object (e.g., a face of a user) displayed on the execution screen of the application. Alternatively, in the information field for the display position may be stored information for controlling the position of the graphical content 510 to display the graphical content 510 on the execution screen of the application adaptively (in other words, variably) depending on the position of the object displayed on the execution screen of the application. According to various embodiments of the present disclosure, in the information field for the display position, information about the position where the first image 402 is displayed on the first region 430 may be stored.

Figure 5B:
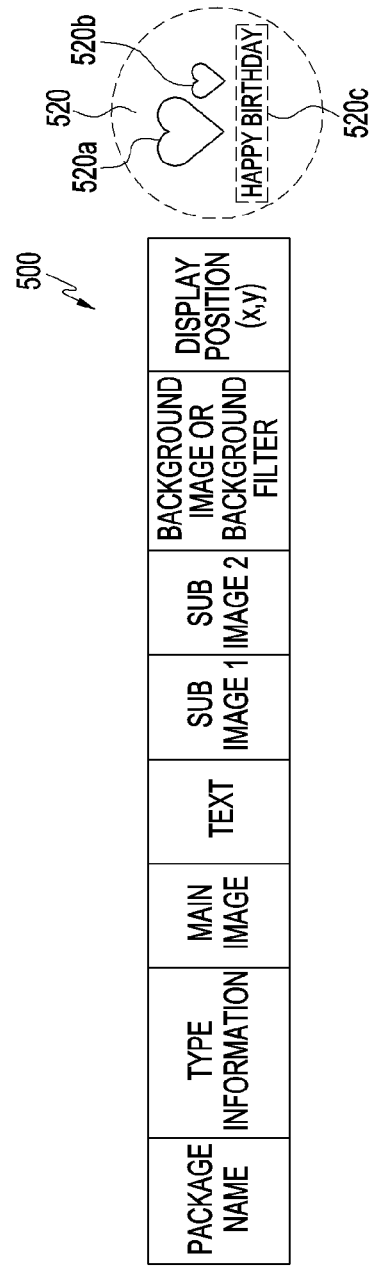

In FIG. 5B is illustrated an embodiment in which graphical content 520 includes two sub-images 520a and 520b, and a text 520c. In this case, the information field of the graphical content 520 may additionally/alternatively include an information field about the text 520c. In the information field about the text, information about various texts included in the graphical content 520 may be stored. According to various embodiments of the present disclosure, the text may be previously set or may be set by the user 420.

Figure 5C:
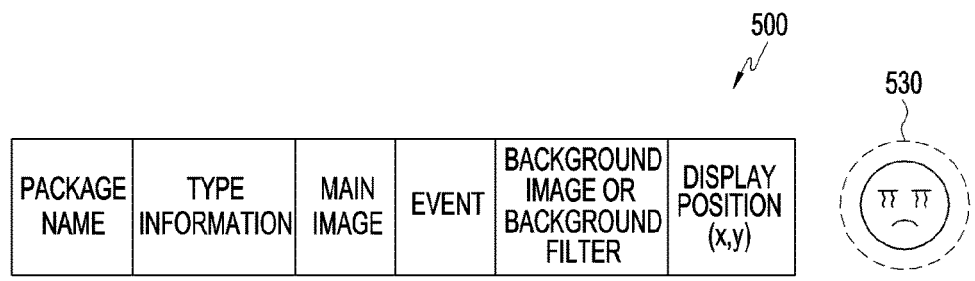

FIG. 5C illustrates an embodiment where the graphical content 530 is a dynamic graphical content. The dynamic graphical content 530 may be graphical content including an event where tears flow in a tear shedding facial expression. In this case, the information field of the graphical content 520 may additionally/alternatively include the information field about the event. In the information field about the event may be stored information about a tear shedding motion. According to various embodiments of the present disclosure, the main image may be stored as a static image of the graphical content 530 at a particular point in time. The stored static image may be displayed, for example, in the first region 430.

Figure 5D:
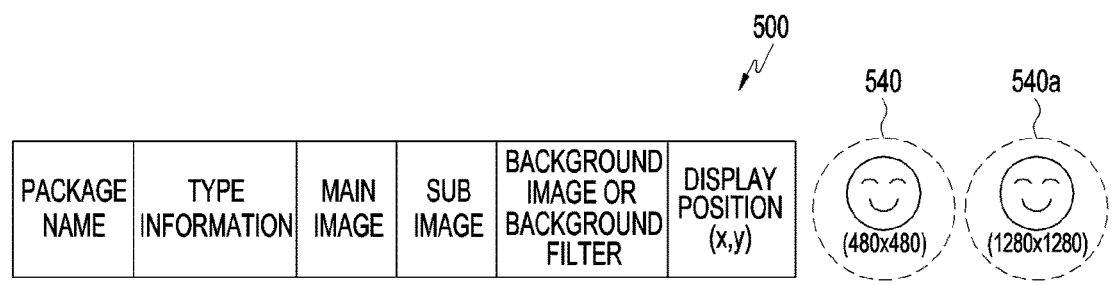

In FIG. 5D is illustrated an embodiment where graphical content 540 includes a sub-image 540a having a different resolution, but the same configuration FIG. 5D may show a case where graphical content (e.g., the graphical content 540) having a lower resolution of 480×480 is set as the main image. According to various embodiments of the present disclosure, the information about the graphical content 540 may be stored in the information field about the main image. The information about the graphical content 540 may be stored in an information field for the sub-image 540a. According to various embodiments of the present disclosure, the graphical content 540 having the low resolution may be displayed on the first region 430. According to various embodiments of the present disclosure, upon receiving a selection input with respect to the graphical content 540 displayed on the first region 430, the electronic device 101 may display the graphical content 540 having a high resolution stored in the information field for the sub-image 540a on the execution screen of the application. According to various embodiments of the present disclosure, a resolution of at least one image displayed on the first region 430 and/or the second region 440 may be the same as or different from a resolution of graphical content displayed on the execution screen of the application.

According to various embodiments of the present disclosure, the information field illustrated in FIGS. 5A through 5D may include an information field for the graphical contents 510, 520, 530, and 540 actually displayed on the execution screen of the application (e.g., the camera application), aside from the information field for the main image or the information field for the sub-image 540a, additionally/exchangeably with another field. In the information field for the graphical contents 510, 520, 530, and 540 may be stored various information about the graphical contents 510, 520, 530 and 540 such as sizes, resolutions, and/or display positions of the graphical contents 510, 520, 530 and 540. According to various embodiments of the present disclosure, the various information about the graphical contents 510, 520, 530 and 540 such as sizes, resolutions, and/or display positions of the graphical contents 510, 520, 530 and 540 may be stored in the information field for the main image. The electronic device 101 may display the graphical contents 510, 520, 530, and 540 on the execution screen of the application based on the various information of the graphical contents 510, 520, 530, and 540 stored in the information field for the main image or the information field for the graphical contents 510, 520, 530, and 540.

FIGS. 6A and 6B are views for describing a function/operation of storing graphical content based on type information, according to various embodiments.

Referring to FIG. 6A, graphical content package obtained from a server (e.g., the server 108) may include information 600 about a representative image (e.g., the second image 404 displayed on the second region 440) representing the graphical content package and information 510 about each graphical content included in the graphical content package. According to various embodiments of the present disclosure, the information 600 about the representative image may include a reference number, a package name, an image displayed on a tray, and type information. According to various embodiments of the present disclosure, the information 610 about the graphical content may include a package name, a sticker name, a thumbnail image, a thumbnail image ID, event information scene type, and a display order suborder. However, the information illustrated in FIG. 6A has been illustrated as an example to describe embodiments of the present disclosure. According to various embodiments of the present disclosure, once the electronic device 101 (e.g., the processor 120) obtains the graphical content package, the information 600 about the representative image and the information 610 about the graphical content may be stored in a memory region allocated for an application corresponding to the type information, based on the type information. In at least some embodiments, the term "memory region" allocated for the application, may be mentioned as a term "application database".

Referring to FIG. 6A, According to various embodiments of the present disclosure, the information 600 about the representative image and the information 610 about the graphical content may be stored in a memory region that is accessible in common (in other words, available) to various applications installed in the electronic device 101, instead of being stored in the application database. In at least some embodiments, the term "memory region accessible in common" may be referred to as a term "content provider". According to various embodiments of the present disclosure, the information 600 about the representative image and the information 610 about the graphical content may be grouped (in other words, sorted) by the information type and stored. In FIG. 6B is illustrated an embodiment where the information 610 about the graphical content is grouped by the type information 620 and stored.

According to various embodiments of the present disclosure, at least a part of the various information illustrated in FIGS. 5A through 6B may be stored in the graphical content package according to a data format and transmitted to the electronic device 101. According to various embodiments of the present disclosure, the data format may include, for example, a "j son" file. According to various embodiments of the present disclosure, the "j son" file may further include not only the various information described in FIGS. 5A through 6B, but also various information such as version information of the graphical content package, sound information about the graphical content, contrast information about the graphical content, information about a black/white mode of the graphical content, information about a time at which the graphical content is displayed on the execution screen of the application, etc.

According to various embodiments of the present disclosure, the graphical content, the first image 402, and the second image 404 may have the same shape, and at least some of them may have different shapes.

Figure 7:
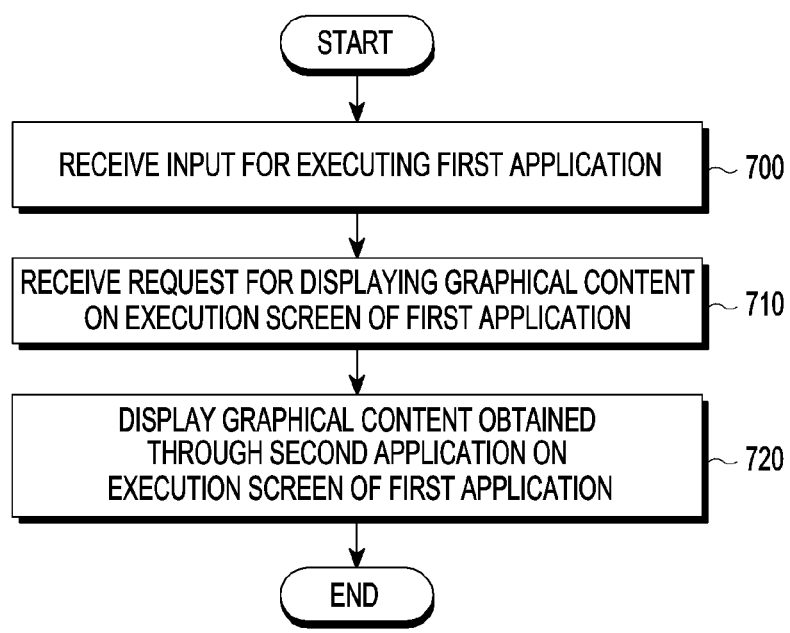
FIG. 7 is a view for describing an operation method of an electronic device, according to various embodiments.

FIG. 7 is a view for describing an operation method of an electronic device, according to various embodiments.

Referring to FIG. 7, according to various embodiments of the present disclosure, in operation 700, the electronic device 101 (e.g., the processor 120) may receive an input for executing a first application by using an input device (e.g., the display device 160).

Referring to FIG. 7, according to various embodiments of the present disclosure, in operation 710, the electronic device 101 (e.g., the processor 120) may receive a request for displaying the graphical content on an execution screen of the first application, by using the input device (e.g., the display device 160).

Referring to FIG. 7, according to various embodiments of the present disclosure, in operation 720, the electronic device 101 (e.g., the processor 120) may display graphical content obtained through a second application on the execution screen of the first application by using an output device (e.g., the display device 160).

Figure 8A:
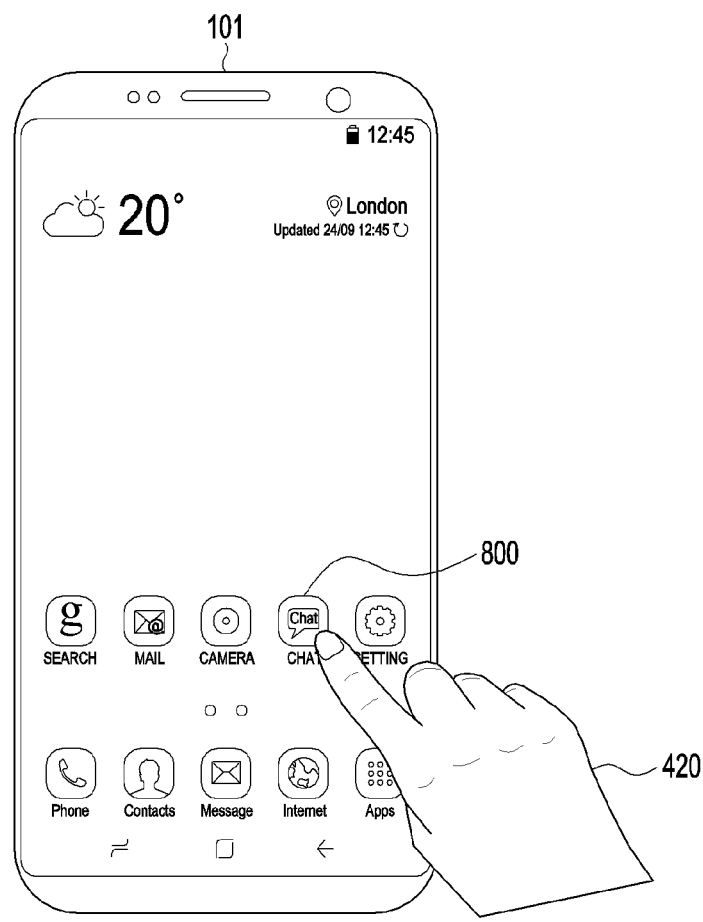
FIGS. 8A through 8C are views for describing a function/operation of providing graphical content obtained through a first application in a second application, according to various embodiments.
Figure 8B:
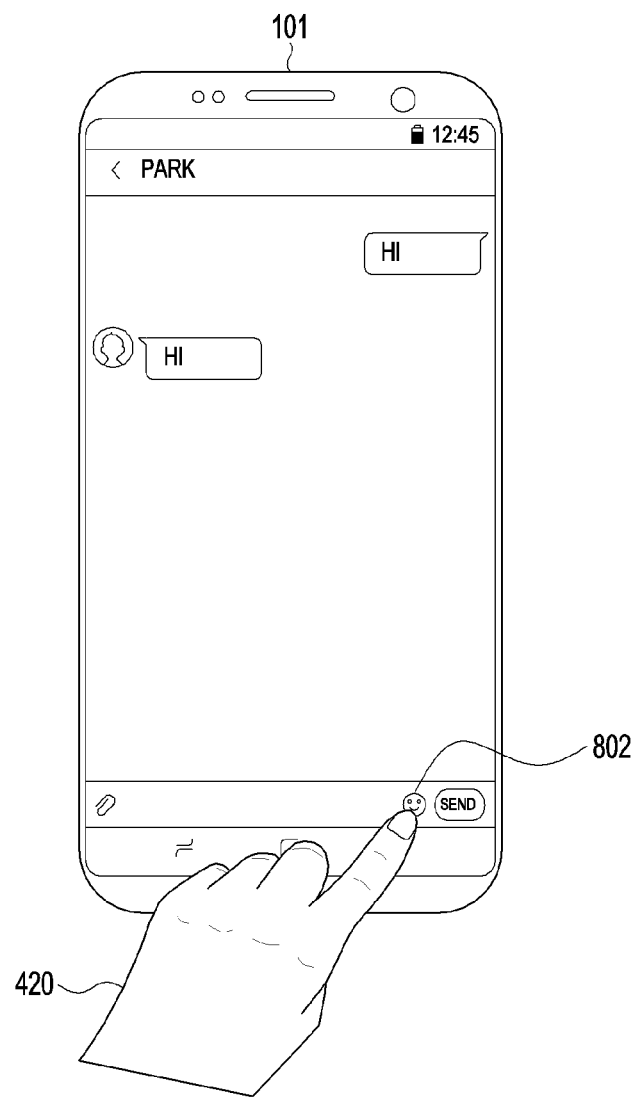
Figure 8C:
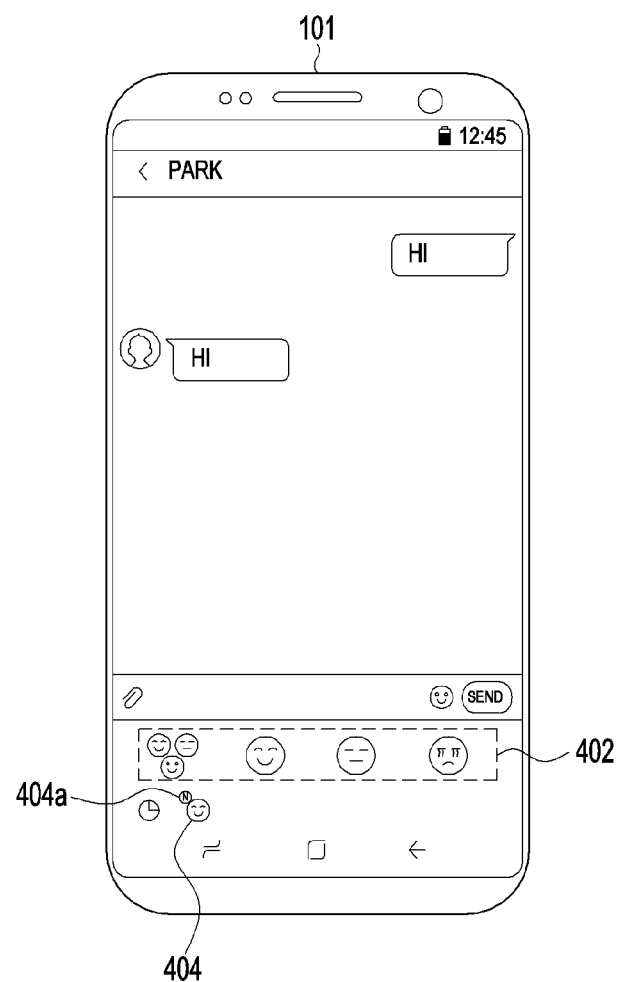

FIGS. 8A through 8C are views for describing a function/operation of providing graphical content obtained through a first application in a second application, according to various embodiments.

Referring to FIG. 8A, the electronic device 101 may receive an execution input with respect to an application (e.g., a chat application 800) from the user 420.

Referring to FIG. 8B, the electronic device 101 may receive an input for using the graphical content on the execution screen of the chat application 800. According to various embodiments of the present disclosure, the input for using the graphical content may include a touch input with respect to an interface 802 displayed on the execution screen of the chat application 800. Referring to FIG. 8B, the electronic device 101 may display the first image 402 and the second image 404 on the execution screen of the chat application 800 in response to an input for using the graphical content. According to various embodiments of the present disclosure, the first image 402, the second image 404, and the graphical content displayed on the execution screen of the chat application 800 may be obtained during execution of another application (e.g., the camera application) that is different from the chat application 800. Herein, the term "another application" may be mentioned as the term "second application". Herein, although ordinal numbers such as "first," "second," and so forth will be used to describe various components, those components are not limited herein. The terms are used only for distinguishing one component from another component. For example, a first element may be named as a second element without departing from the right scope of the various exemplary embodiments of the disclosure, and similarly, a second element may be named as a first element. The term "and/or" used herein includes any and all combinations of one or more of the associated listed items.

According to various embodiments of the present disclosure, the another application (e.g., the second application) may be an application stored (in other words, recorded or installed) to be executable on an external device (e.g., the electronic device 102 and/or the electronic device 104) connected with the electronic device 101 operably through wired or wireless communication. According to various embodiments of the present disclosure, the electronic device (e.g., the processor 120) may determine whether at least one application among applications stored in the external devices 102 and 104 may use the graphical content. The determining function/operation may be performed, for example, based on the type information of the graphical content. The electronic device 101 may transmit the graphical content to the external devices 102 and 104 to provide the graphical content through the at least one application stored in the external devices 102 and 104 based on the determining function/operation. The transmitting function/operation may be performed by, for example, a communication module (e.g., the communication module 190) of the electronic device 101.

Upon detection of an input for using the graphical content, the electronic device 101 (e.g., the processor 120) may do a query (in other words, a search) on whether graphical content executable (in other words, available) on the chat application 800 is stored in the application database or the content provider. According to various embodiments of the present disclosure, the query may be done through a designated application controlled by the processor 120. The designated application may identify (in other words, detect) an application that may use the graphical content and/or the graphical content package, based on type information stored in the content provider. According to various embodiments of the present disclosure, once the graphical content and/or the graphical content package is obtained, the designated application may store the graphical content and/or the graphical content package in the application database based on type information included in the graphical content and/or the graphical content package.

According to various embodiments of the present disclosure, the designated application controlled by the processor 120 may do a query on whether a new graphical content and/or a new graphical content package executable on the chat application 800 is stored in the application database or the content provider. The term "new graphical content and/or new graphical content package" may mean graphical content and/or graphical content package in which a pre-designated time range (e.g., three hours from when the graphical content package is obtained) has not elapsed from when the graphical content and/or the graphical content package is obtained by the electronic device 101. However, according to various embodiments of the present disclosure, in spite of the non-elapse of the pre-designated time range, when there is a record of an access to the graphical content and/or the graphical content package by the user, the electronic device 101 may not determine the graphical content and/or the graphical content package as the new graphical content and/or the new graphical content package. Referring to FIG. 8C, according to various embodiments of the present disclosure, when the new graphical content and/or the new graphical content package is stored, the electronic device 101 may display an interface for delivering notification information 404a indicating the new graphical content package around the second image 404. However, the embodiment shown in FIG. 8C is an example for describing the embodiments of the present disclosure, and the notification information may be delivered in various forms such as audible information.

According to various embodiments of the present disclosure, the query and/or determining function/operation, controlled by the processor 120 through the designated application, may be directly performed by the processor 120 without control through the designated application.

Figure 9:
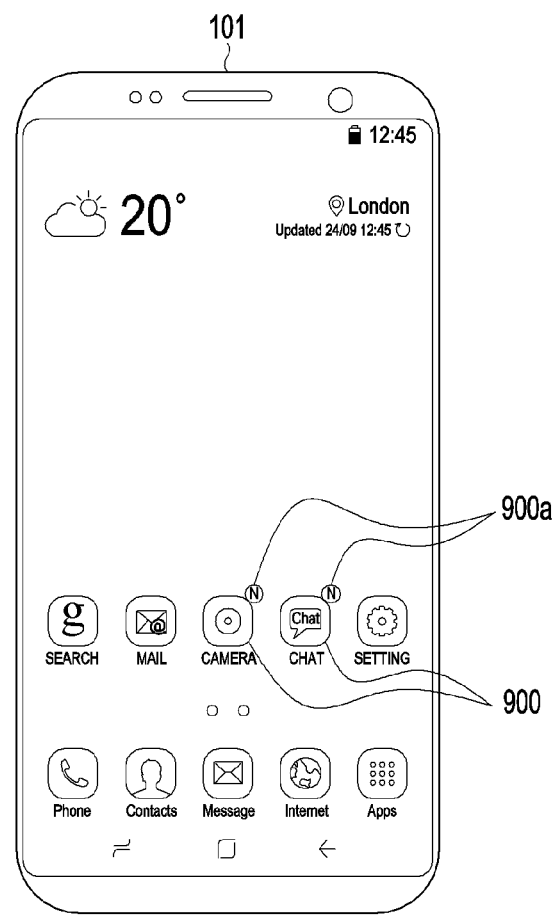
FIG. 9 is a view for describing a function/operation of providing notification information indicating that graphical content is newly obtained, according to various embodiments.

FIG. 9 is a view for describing a function/operation of providing notification information indicating that graphical content is newly obtained, according to various embodiments.

Referring to FIG. 9, additionally to/exchangeably with the embodiment shown in FIG. 8B, the electronic device 101 may display notification information 900a around an interface 900 (e.g., a shortcut icon) for executing the application on a home screen. In at least some embodiments, a state where a shortcut icon for an application is displayed on the home screen may be described as being included in the term "execution screen" of the application corresponding to execution of a launcher application for the application.

Figure 10:
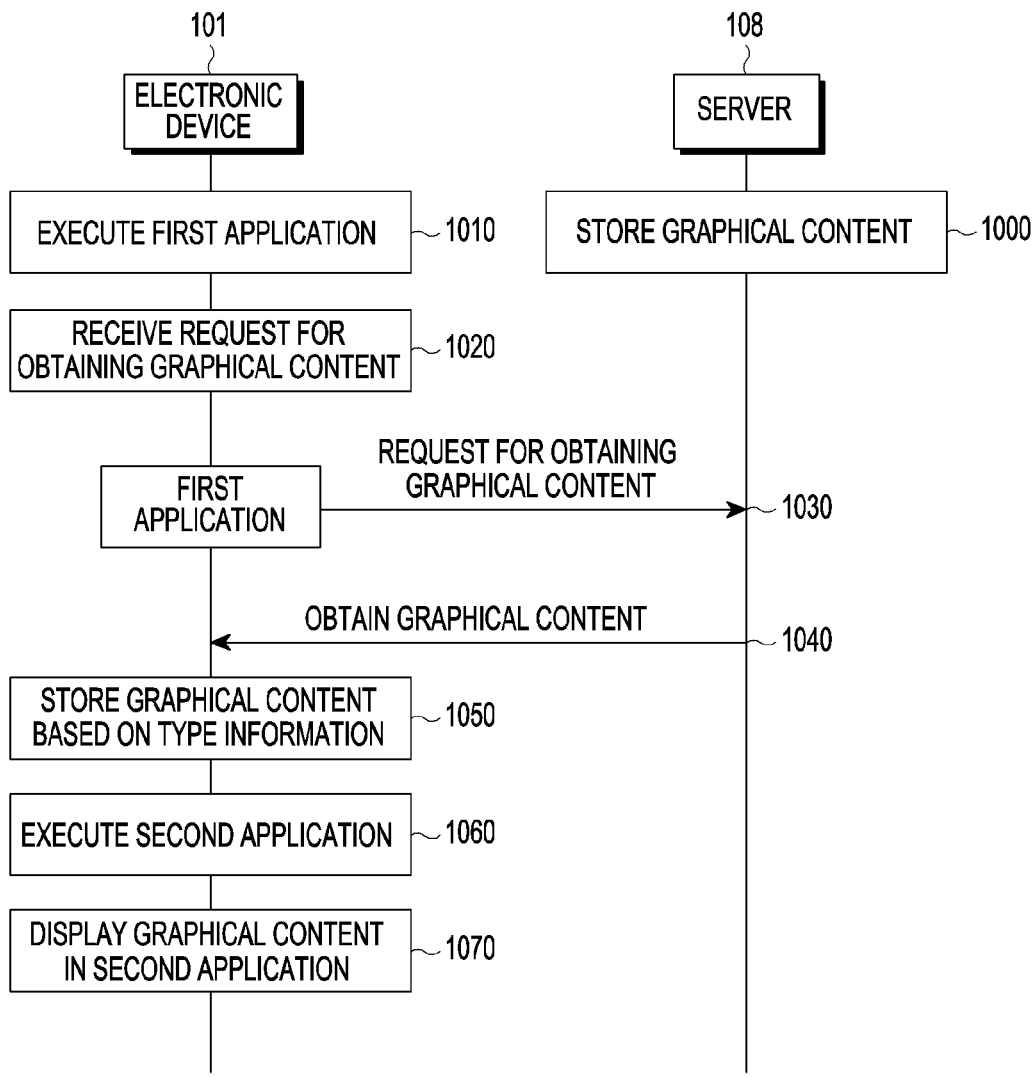
FIG. 10 is a view for describing an operation between an electronic device and a server, according to various embodiments.

FIG. 10 is a view for describing an operation between an electronic device and a server, according to various embodiments.

According to various embodiments of the present disclosure, in operation 1000, the server 108 may store graphical content and/or a graphical content package.

According to various embodiments of the present disclosure, in operation 1010, the electronic device 101 (e.g., the processor 120) may execute a first application in response to a user input.

According to various embodiments of the present disclosure, in operation 1020, the electronic device 101 (e.g., the processor 120) may receive a request for obtaining the graphical content and/or the graphical content package, by using an input device (e.g., the display device 160).

According to various embodiments of the present disclosure, in operation 1030, the electronic device 101 (e.g., the processor 120) may transmit the request for obtaining the graphical content and/or the graphical content package to the server 108 on an execution screen of the first application, by using a communication device (e.g., the communication module 190).

According to various embodiments of the present disclosure, in operation 1040, the electronic device 101 (e.g., the processor 120) may obtain the graphical content and/or the graphical content package from the server 108, by using the communication device (e.g., the communication module 190).

According to various embodiments of the present disclosure, in operation 1050, the electronic device 101 (e.g., the processor 120) may store the obtained graphical content and/or graphical content package in a storage device (e.g., the memory 130) based on type information.

According to various embodiments of the present disclosure, in operation 1060, the electronic device 101 (e.g., the processor 120) may execute a second application in response to a user input.

According to various embodiments of the present disclosure, in operation 1070, the electronic device 101 (e.g., the processor 120) may display graphical content in the second application by using an output device (e.g., the display device 160).

Figure 11:
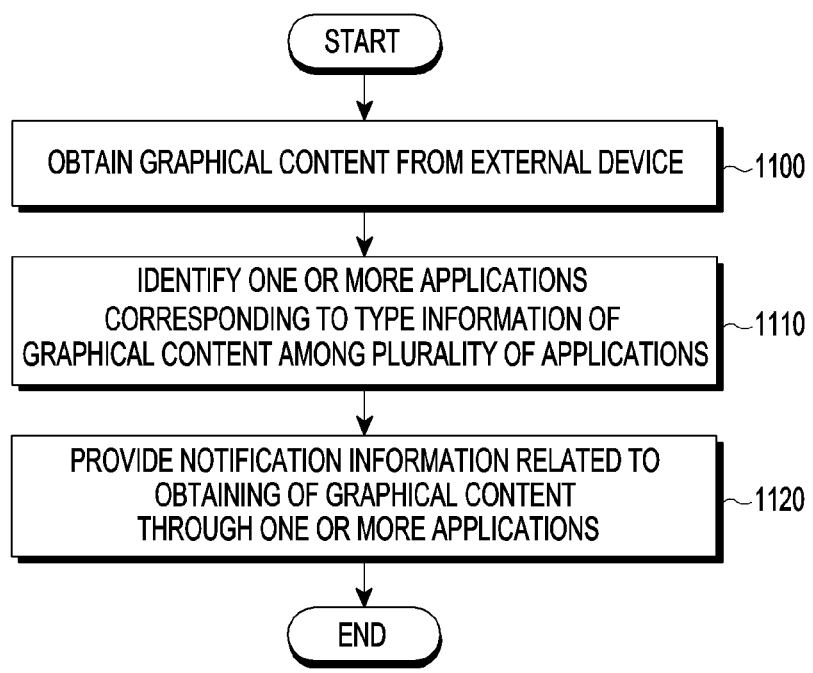
FIGS. 11 through 13 are views for describing an operation method of an electronic device, according to various embodiments.
Figure 12:
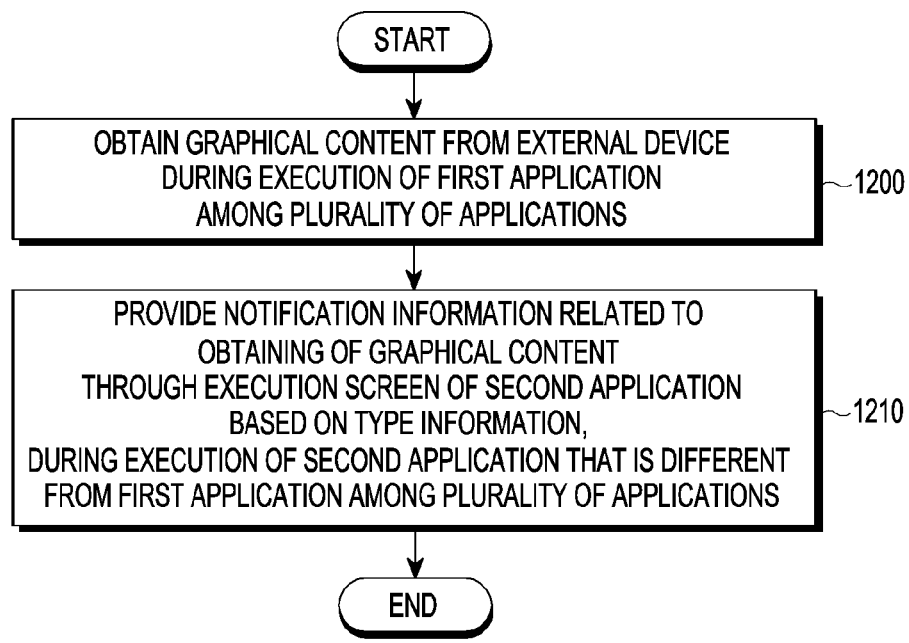
Figure 13:
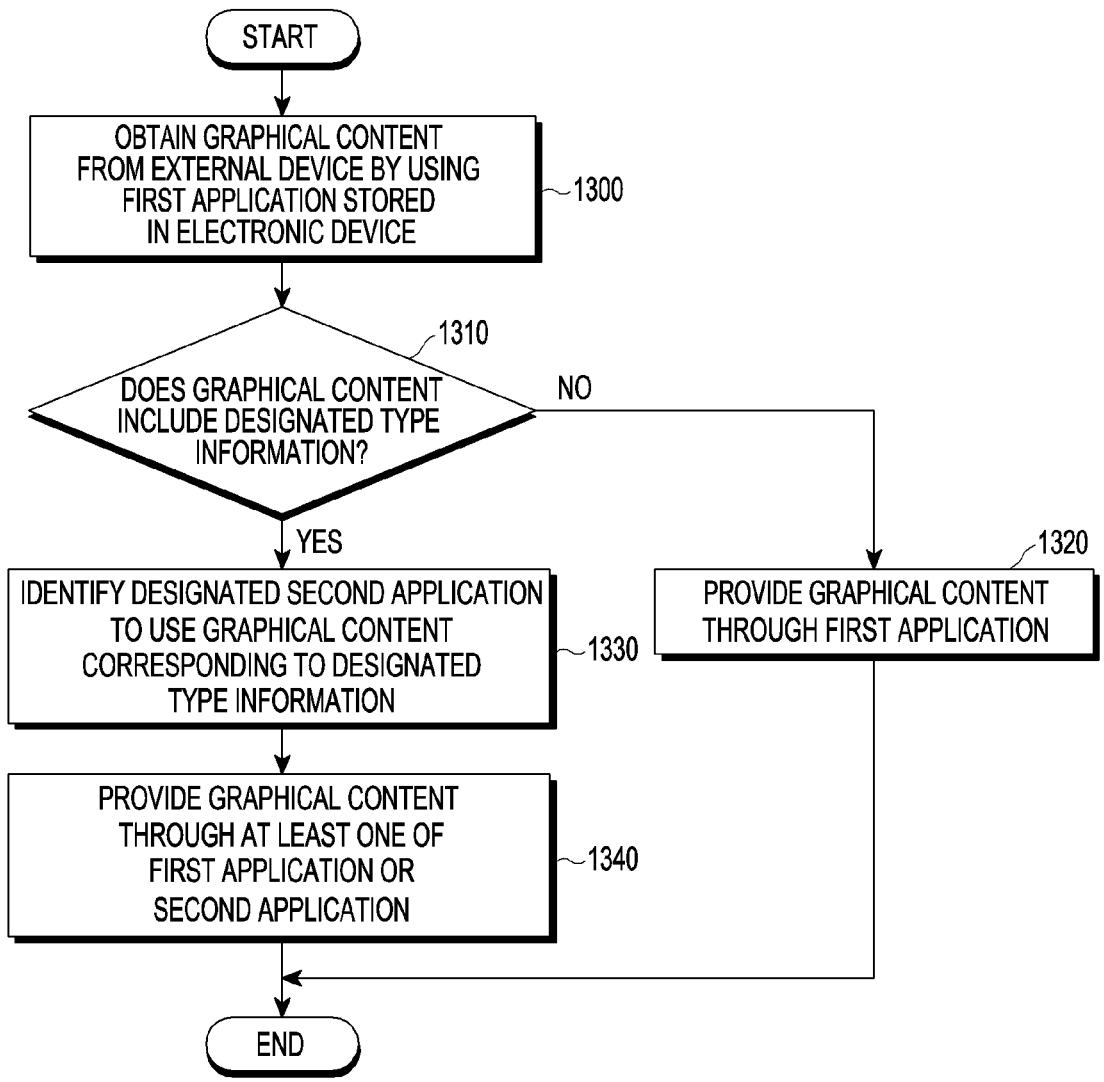

FIGS. 11 through 13 are views for describing an operation method of an electronic device, according to various embodiments.

Referring to FIG. 11, according to various embodiments of the present disclosure, in operation 1100, the electronic device 101 (e.g., the processor 120) may obtain graphical content from an external device (e.g., a first external electronic device), by using the communication device (e.g., the communication module 190).

According to various embodiments of the present disclosure, in operation 1110, the electronic device 101 (e.g., the processor 120) may identify (in other words, detect) one or more applications corresponding to the type information of the graphical content among a plurality of applications.

According to various embodiments of the present disclosure, in operation 1120, the electronic device 101 (e.g., the processor 120) may provide notification information related to obtaining of the graphical content through the one or more applications by using the output device (e.g., the display 160).

Referring to FIG. 12, according to various embodiments of the present disclosure, in operation 1200, the electronic device 101 (e.g., the processor 120) may obtain graphical content from the external device during execution of the first application among the plurality of applications, by using the communication device (e.g., the communication module 190).

According to various embodiments of the present disclosure, in operation 1210, the electronic device 101 (e.g., the processor 120) may provide notification information related to obtaining of the graphical content based on the type information through an execution screen of the second application during execution of the second application that is different from the first application among the plurality of applications, by using the output device (e.g., the display device 160).

According to various embodiments of the present disclosure, the graphical content and/or the graphical content package may not include the type information. In relation to FIG. 13, a description will be made of an embodiment where the electronic device 101 (e.g., the processor 120) performs various functions/operations based on whether the graphical content and/or the graphical content package includes the type information.

Referring to FIG. 13, according to various embodiments of the present disclosure, in operation 1300, the electronic device 101 (e.g., the processor 120) may obtain graphical content from the external device through the first application stored in the electronic device 101, by using the communication device (e.g., the communication module 190).

According to various embodiments of the present disclosure, in operation 1310, the electronic device 101 (e.g., the processor 120) may determine whether the graphical content includes designated type information.

According to various embodiments of the present disclosure, in operation 1320, the electronic device 101 (e.g., the processor 120) may provide the graphical content through the first application based on that the graphical content does not include the designated type information, by using the output device (e.g., the display device 160).

According to various embodiments of the present disclosure, in operation 1330, the electronic device 101 (e.g., the processor 120) may identify (in other words, detect) the second application configured to use graphical content corresponding to the designated type information, based on that the graphical content includes the designated type information.

According to various embodiments of the present disclosure, in operation 1340, the electronic device 101 (e.g., the processor 120) may provide the graphical content through at least one of the first application or the second application, by using the output device (e.g., the display device 160).

According to various embodiments of the present disclosure, an electronic device includes a communication module, a memory storing a plurality of applications, a display, and a processor, in which the processor is configured to obtain graphical content from an external device by using the communication module, the graphical content including type information related to an application that may use the graphical content, to identify one or more applications related to the type information among the plurality of applications, and to provide notification information related to the obtaining of the graphical content through the one or more applications.

According to various embodiments of the present disclosure, the processor may be configured to store the graphical content in a storage region allocated to at least some application of the one or more applications, based on the type information.

According to various embodiments of the present disclosure, the processor may be configured to group and store the graphical content based on the type information.

According to various embodiments of the present disclosure, the processor may be configured to obtain the graphical content and display the graphical content on an execution screen of any one of the one or more applications, upon receiving an input for obtaining the graphical content during execution of the any one application.

According to various embodiments of the present disclosure, the processor may be configured to display the notification information around an icon corresponding to the one or more applications upon obtaining the graphical content.

According to various embodiments of the present disclosure, the processor may be configured to determine based on the type information whether a designated application is any one of the one or more applications, when receiving an input for executing the designated application after obtaining the graphical content.

According to various embodiments of the present disclosure, the processor may be configured to display the obtained graphical content on an execution screen of the designated application during execution of the designated application in response to a request for displaying the graphical content, when the designated application corresponds to any one of the one or more applications.

According to various embodiments of the present disclosure, the processor may be configured to receive a graphical content package from the external device, in which the graphical content package may include a plurality of graphical contents.

According to various embodiments of the present disclosure, the electronic device may further include a touch screen displaying the graphical content and receiving an input for obtaining the graphical content.

According to various embodiments of the present disclosure, the electronic device may further include a communication module, in which the processor may be configured to determine whether at least one of applications stored in a second external device connected with the electronic device through a network uses the graphical content, by using the communication module and to transmit the graphical content to the second external device to provide the graphical content to the second external device through the at least one application, based on the determination.

According to various embodiments of the present disclosure, an electronic device may include a communication module, a memory, a display, and a processor, in which the processor is configured to store graphical content obtained from a external device by using a first application stored in the memory, to determine whether the graphical content includes designated type information, to provide the graphical content through the first application based on that the graphical content does not include the designated type information, and to identify a second application configured to use graphical content corresponding to the designated type information based on that the graphical content includes the designated type information, and to provide the graphical content through at least one of the first application or the second application.

According to various embodiments of the present disclosure, the processor may be configured to display notification information around an icon corresponding to at least one of the first application or the second application upon obtaining the graphical content.

According to various embodiments of the present disclosure, the processor may be configured to group and store the graphical content obtained from the external device in the memory, based on the type information.

According to various embodiments of the present disclosure, the processor may be configured to transmit the graphical content to the second external device to provide the graphical content through the second application stored in a second external electronic device connected with the electronic device through a network, by using the communication module.

According to various embodiments of the present disclosure, a computer-readable recording medium may have stored therein instructions configured to perform at least one operation, in which the at least one operation includes obtaining graphical content from an external device by using a communication module, the graphical content including type information corresponding to an application that may use the graphical content, identifying one or more applications corresponding to the type information among a plurality of applications, and providing notification information related to the obtaining of the graphical content through the one or more applications.

According to various embodiments of the present disclosure, an operation method of an electronic device includes obtaining graphical content from an external device during execution of a first application among a plurality of applications, the graphical content including type information corresponding to an application that may use the graphical content, and providing notification information related to the obtaining of the graphical content based on the type information through an execution screen of a second application during execution of the second application that is different from the first application among the plurality of applications.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). The machine may invoke stored instructions from the storage medium and operate according to the invoked instructions, and may include an electronic device (e.g., the electronic device 101) according to the disclosed embodiments. When the instructions are executed by a processor (for example, the processor 120), functions corresponding to the instructions may be performed directly by the processor or using other components under control of the processor. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

The invention claimed is:

1. An electronic device comprising:
a communication module;
a memory storing a plurality of applications;
a display; and
a processor,
wherein the processor is configured to:
obtain graphical content from a first external device by using the communication module, the graphical content comprising type information related to an application capable of using the graphical content, wherein the graphical content includes a package name field, a type information field, main image field, and a plurality of sub image fields, wherein the graphical content includes a dynamic content, wherein an image which is stored in the main image field includes a static image of the graphical content at a specific time point, and wherein each of a plurality of sub images included in a main image is stored in each of the plurality of sub image fields;
identify one or more applications corresponding to the type information among the plurality of applications, wherein the type information is stored in the type information field; and
provide notification information related to the obtaining of the graphical content through each of a plurality of icons indicating the one or more applications, and
wherein an execution screen of one application among the one or more applications includes a first area in which a plurality of images included in a package of the graphical content are displayed, and a second area, different from the first area, in which the main image and the notification information are displayed.

2. The electronic device of claim 1, wherein the processor is configured to store the graphical content in a storage region allocated to at least some applications of the one or more applications, based on the type information.

3. The electronic device of claim 1, wherein the processor is configured to group and store the graphical content based on the type information.

4. The electronic device of claim 1, wherein the processor is configured to determine based on the type information whether a designated application is any one of the one or more applications, when receiving an input for executing the designated application after obtaining the graphical content.

5. The electronic device of claim 4, wherein the processor is configured to display the obtained graphical content on an execution screen of the designated application during execution of the designated application in response to a request for displaying the graphical content, when the designated application corresponds to any one of the one or more applications.

6. A non-transitory computer-readable recording medium having stored therein instructions configured to perform at least one operation by a processor,
wherein the at least one operation comprises:
obtaining graphical content from a first external device by using a communication module, the graphical content comprising type information corresponding to an application capable of using the graphical content, wherein the graphical content includes a package name field, a type information field, main image field, and a plurality of sub image fields, wherein the graphical content includes a dynamic content, wherein an image which is stored in the main image field includes a static image of the graphical content at a specific time point, and wherein each of a plurality of sub images included in a main image is stored in each of the plurality of sub image fields;
identifying one or more applications corresponding to the type information among a plurality of applications, wherein the type information is stored in the type information field; and
providing notification information related to the obtaining of the graphical content through each of a plurality of icons indicating the one or more applications, and
wherein an execution screen of one application among the one or more applications includes a first area in which a plurality of images included in a package of the graphical content are displayed, and a second area, different from the first area, in which the main image and the notification information are displayed.

7. The non-transitory computer-readable recording medium of claim 6, wherein the at least one operation further comprises storing the graphical content in a storage region allocated to each of the one or more applications, based on the type information.

8. The non-transitory computer-readable recording medium of claim 6, wherein the at least one operation further comprises grouping and storing the graphical content based on the type information.

9. The non-transitory computer-readable recording medium of claim 6, wherein the at least one operation further comprises determining based on the type information whether a designated application is any one of the one or more applications, when receiving an input for executing the designated application after obtaining the graphical content.

10. The non-transitory computer-readable recording medium of claim 9, wherein the at least one operation further comprises displaying the obtained graphical content on an execution screen of the designated application during execution of the designated application in response to a request for displaying the graphical content, when the designated application corresponds to any one of the one or more applications.

11. An electronic device comprising:
a communication module;
a memory;
a display; and
a processor,
wherein the processor is configured to:
store graphical content obtained from a external device by using a first application stored in the memory, wherein the graphical content includes a package name field, a type information field, main image field, and a plurality of sub image fields, wherein the graphical content includes a dynamic content, wherein an image which is stored in the main image field includes a static image of the graphical content at a specific time point, and wherein each of a plurality of sub images included in a main image is stored in each of the plurality of sub image fields;
determine whether the graphical content comprises designated type information, wherein the designated type information is stored in the type information field;
provide the graphical content through the first application based on determining that the graphical content does not comprise the designated type information;
identify a second application configured to use the graphical content corresponding to the designated type information, based on determining that the graphical content comprises the designated type information, and provide the graphical content through at least one of the first application or the second application; and
display notification information around an icon corresponding to at least one of the first application or the second application, upon obtaining the graphical content, and
wherein an execution screen of the first application includes a first area in which a plurality of images included in a package of the graphical content are displayed, and a second area, different from the first area, in which the main image and the notification information are displayed.

12. The electronic device of claim 11, wherein the processor is configured to group and store the graphical content obtained from the external device in the memory, based on the designated type information.

* * * * *